(12) United States Patent
Ries et al.

(10) Patent No.: US 7,392,332 B2
(45) Date of Patent: Jun. 24, 2008

(54) BIT RATE ADAPTATION IN A DATA PROCESSING FLOW

(75) Inventors: Gilles Ries, Herbeys (FR); Jean-François Agaesse, Montferrat (FR)

(73) Assignee: STMicroelectronics S.A., Montrouge (FR)

( * ) Notice: Subject to any disclaimer, the term of this patent is extended or adjusted under 35 U.S.C. 154(b) by 200 days.

(21) Appl. No.: 11/480,306

(22) Filed: Jun. 30, 2006

(65) Prior Publication Data

US 2007/0061661 A1     Mar. 15, 2007

(30) Foreign Application Priority Data

Jul. 6, 2005     (FR) .................................. 05 07203

(51) Int. Cl.
 *G06F 13/20* (2006.01)
 *G06F 13/00* (2006.01)
(52) U.S. Cl. .............................. 710/38; 710/29; 710/62; 710/72; 710/316; 704/256; 708/230
(58) Field of Classification Search ............. 710/29–42, 710/62–64, 72–74, 316–317; 704/256; 708/524, 708/308, 256, 230
See application file for complete search history.

(56) References Cited

U.S. PATENT DOCUMENTS

| | | | | |
|---|---|---|---|---|
| 4,720,780 A | * | 1/1988 | Dolecek ...................... | 712/18 |
| 5,055,997 A | * | 10/1991 | Sluijter et al. ................ | 710/317 |
| 5,546,544 A | * | 8/1996 | Dike et al. ................... | 710/107 |
| 5,689,450 A | * | 11/1997 | Kurokawa et al. .......... | 708/524 |
| 7,054,964 B2 | * | 5/2006 | Chan et al. .................... | 710/65 |
| 7,165,133 B2 | * | 1/2007 | Takeuchi et al. ............ | 710/110 |

FOREIGN PATENT DOCUMENTS

| | | |
|---|---|---|
| EP | 1 401 108 A1 | 3/2004 |
| EP | 1 509 044 A2 | 2/2005 |

OTHER PUBLICATIONS

Preliminary French Search Report, FR 05 07203, dated Apr. 13, 2006.

* cited by examiner

*Primary Examiner*—Christopher B. Shin
(74) *Attorney, Agent, or Firm*—Gardere Wynne Sewell LLP

(57) ABSTRACT

A dedicated processing module includes an input for data to be processed and an output for processed data. A block input and a block output are also included. A processing component for the module performs a digital processing operation on the data present at the data input and applies the processed data at the data output. The processor may further generate a block request. A control device within the module reproduces, at the block output, a block request applied to the block input or generated by the processing component. The control device thus may operate to block the application of processed data at the data output upon receipt of a block request at the block input. Two or more dedicated processing modules may be connected in series with each other to form a processing flow chain with the data output of one module connected to the data input of a subsequent module. Additionally, the block output of the subsequent module is connected to the block input of the preceding module.

20 Claims, 4 Drawing Sheets

BIT RATE ADAPTATION IN A DATA PROCESSING FLOW

PRIORITY CLAIM

The present application claims priority from French Application for Patent No. 05 07203 filed Jul. 6, 2005, the disclosure of which is hereby incorporated by reference.

BACKGROUND OF THE INVENTION

1. Technical Field of the Invention

The present invention relates in general to data processing flows, and in particular to the adaptation of a bit rate in a data processing flow.

2. Description of Related Art

A bit rate adaptation takes place when a function implemented in the data processing flow modifies the data rate, i.e., when the average amount of data varies between the input and the output of the function. The presence of functions for bit rate adaptation in a processing flow makes its time behavior unpredictable. When the processing flow involves a plurality of bite rate adaptation functions in series, it is difficult to implement at the hardware level. Indeed, a large number of possible configurations must be tested in order to provide an interruption-free processing flow.

Software management of the processing flows is generally used for reduced rates, for example less than one Mbit/s. FIGS. 1 and 2 diagrammatically show such an operation. A general use processor 1, a storage 2 and an interface 4 communicate via the bus 3. The processor 1 is used to sequentially process all of the functions required by the processing flow. Each function of the processor 1 is assigned a dedicated storage location 2. The interface 4 transmits, to the processor 1, a data block to be processed by a function. The function then processes the data block in the processor 1 (for example, by modification, addition or deletion of data). When the function has completed the processing of the block, the modified data block is placed in the dedicated storage location 2. Another function of the processing flow is then launched. A data block is transferred from a dedicated storage location 2 to the processor 1, processed by the function in the processor 1, then transferred to the dedicated storage location. This software solution is relatively easy to debug and develop.

However, the software solution increases the cost of hardware components: this solution requires a processor that is effective enough to implement all of the functions of the flow: such a processor is generally optimized for the specific applications intended by the processing flow. In addition, the amount of memory must be adequate to store a complete data block for each of these functions.

According to an improvement, the storage 2 consists of a small internal cache and a slower, less expensive, larger external storage. Contiguous program data blocks are stored in the internal cache. However, the response time and the power dissipation are generally increased due to the additional transfers caused between the cache and the external storage.

For apparatuses requiring high processing speeds with lower power dissipation (for example, portable apparatuses such as mobile telephones according to the 3GPP standard), a mixed software/hardware solution is preferred. FIGS. 3 and 4 show its operation. The processing of specific functions is thus allocated to an acceleration circuit 5. The acceleration circuit 5 communicates with the general use processor 1 and the storage 2 by means of the bus 3. The processor 1 implements a software processing of a certain number of functions, while other critical functions are processed as desired in the acceleration circuit 5. For example, for a video restitution application, a function associated with the image decompression will be considered to be a critical function.

In a first step, a first block is transferred from the interface 4 to the processor 1. In a second step, a function processes this block in the processor 1. In a third step, this block is transferred to the storage 2. In a fourth step, a block associated with a critical function is transferred from the storage 2 to the acceleration circuit 5. In a fifth step, the critical function processes the block in the acceleration circuit 5. In a sixth step, this block is transferred from the acceleration circuit 5 to the storage 2. Depending on the case, a certain number of transfers between the storage and the acceleration circuit 5 or the processor 1 are performed for the processing of critical or non-critical functions.

When all of the functions are considered to be critical, a hardware solution is adopted. The operation of this solution is shown in FIGS. 5 and 6. When the processing flow is in series (i.e., when the operation sequence can be determined in advance, even if some functions are short-circuited so as to comply with certain operation requirements), the processing operations are performed only by one or more dedicated acceleration circuits 5 forming a processing flow chain by means of intermediate buffer storages 2.

The performance of this solution is superior to that mentioned above. Moreover, its power consumption is lower because only the functions required by the processing flow are integrated into the chain.

However, the development of such a chain is costly. Its architecture is more difficult to develop and may make it necessary to redefine the design of the integrated circuits when they do not have enough available surface. Moreover, as this solution is only hardware transcription of a software solution, significant amounts of memory and data transfers between the acceleration circuits and the storages are still necessary. A functional analysis shows that such an architecture has an amount of intermediate buffer storage that is not essential for the implementation of the functions, but that facilitates the hardware design and development. This memory amount occupies a substantial circuit surface and generates an unnecessary current consumption.

There is accordingly a need to solve one or more of these disadvantages.

SUMMARY OF THE INVENTION

An embodiment of the invention relates to a dedicated processing module, including: an input for data to be processed and an output for processed data; a block input and a block output; a processing component, capable of performing a digital processing operation on the data present at the data input and of applying the processed data at the data output, capable of generating a block request; and a control device reproducing, at the block output, a block request applied to the block input or generated by the processing component and capable of blocking the application of processed data at the data output upon receipt of a block request at the block input.

According to an alternative, the module includes a validation input and a validation output; the processing component performs a processing operation on the data present at the data input only when a validation request is applied at the validation input, and is capable of generating a request to validate processed data and of applying this validation request at the validation output.

According to another alternative, the control device includes a multiplexing device having an input connected to the input for data to be processed, an input connected to the validation input, an input receiving the data processed by the processing component, an input receiving a validation request generated by the processing component. The control device selectively commands the multiplexing device to carry out the following: the connection of the data input and the validation input to the output for processed data and the validation output, respectively; or the application of data processed by the processing component and a validation request generated by the processing component at the processed data output and at the validation output, respectively.

According to another alternative, the processing component includes a clock input; the control device includes a clock input, and selectively reproduces the signal applied at its clock input at the clock input of the processing component.

According to yet another alternative, the processing component is capable of providing the control device with a signal indicating that it is currently processing data; the control device does not reproduce the signal applied at its clock input at the clock input of the processing component in the absence of a signal indicating a processing operation in progress, and when the control component commands the multiplexing device to carry out the connection of the data input and the validation input to the processed data output and the validation output, respectively.

It is also possible for the control device not to reproduce the signal applied at its clock input at the clock input of the processing component in the absence of a signal indicating a processing operation in progress and a validation request at the validation input.

According to an alternative, the control device does not reproduce the signal applied at its clock input at the clock input of the processing component when a validation request is applied at the validation output and when a block request is applied at the block input.

According to another alternative, the control device includes a resynchronization device that: upon receipt of a block request during a clock cycle, stores the data present at the data input and the validation request present at the validation input during this clock cycle, and reproduces the block request at the block output during the next clock cycle; during the clock cycle following the disappearance of the block request at the block input, applies the stored data and request respectively at the data output and at the validation output.

The invention also relates to a processing flow chain, including: a plurality of dedicated processing modules as defined above, connected in series in the chain, the data output, the validation output and the block input of a module being connected respectively to the data input, the validation input and the block output of the module following it in the chain.

According to an alternative, the processing component includes a clock input; the control device includes a clock input, and selectively reproduces the signal applied at its clock input at the clock input of the processing component; the processing flow chain includes a control interface capable of providing the control device with a request to short-circuit a processing module; the control device commands the multiplexing device to carry out the connection of the data input and the validation input respectively to the processed data output and the validation output upon receipt of a short-circuit request.

According to another alternative, the chain includes: first and last modules as described above; an input interface having a data output, a validation output and a block input connected respectively to the data input, the validation input and the block output of the first module; an output interface having a data input, a validation input and a block output connected respectively to the data output, the validation output and the block input of the last module.

An embodiment of the invention also relates to a mobile telephone apparatus including: a processing flow chain as defined above, wherein the input interface has a data input; and a device for transforming radiofrequency signals into a binary data flow, applying the binary data flow at the data input of the input interface.

In accordance with an embodiment, a processing flow chain includes a plurality of dedicated processing modules connected in series. The dedicated processing module comprises a data input for receiving from a preceding module in the series data to be processed and a data output for outputting processed data to a subsequent module in the series, a block input for receiving a block command from the subsequent module in the series indicating that the subsequent module cannot receive the processed data from the data output, and a block output for outputting the block command to the preceding module in the series indicating that the module cannot receive the processed data from the data output of the preceding module, and a validation input for receiving a validation signal from the preceding module in the series indicating that the data received at the data input is valid and a validation output for outputting the validation signal to the subsequent module in the series indicating that the data output from the data output is valid.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

The term dedicated processing module will be used hereinafter to refer to a processing module performing only a predetermined processing function. The processing functions implemented in the processing modules typically consist of performing an addition, a subtraction or a multiplication on input data, or of adding, removing or exchanging one or more bits in these input data.

The invention proposes distributing the control of a processing flow chain at the level of each processing module of the chain. Control signals are propagated in parallel with the data signals in the processing flow chain. Each processing module of the chain exchanges control signals with its successor and its predecessor in the chain, so as to be synchronized with them.

The invention thus provides a simple and inexpensive means to be implemented in order to manage and optimize a processing flow with a variable rate. The invention also makes it possible to reduce the current consumed by the processing flow chain.

Figure 1:
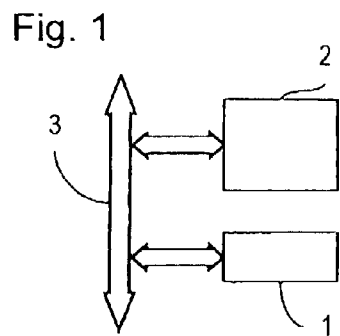
FIGS. 1 to 6 show the management of processing flows according to the prior art.
Figure 2:
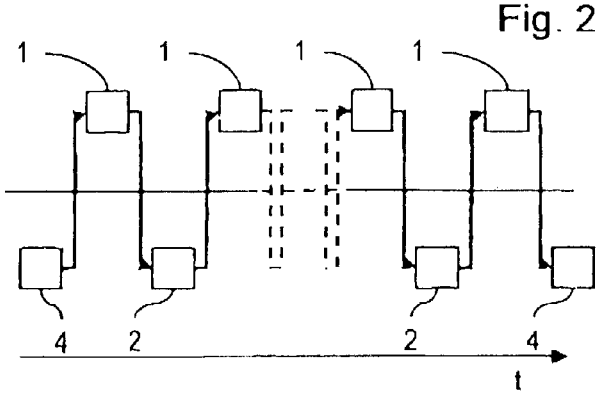
Figure 3:
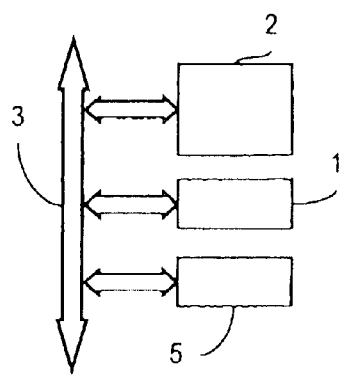
Figure 4:
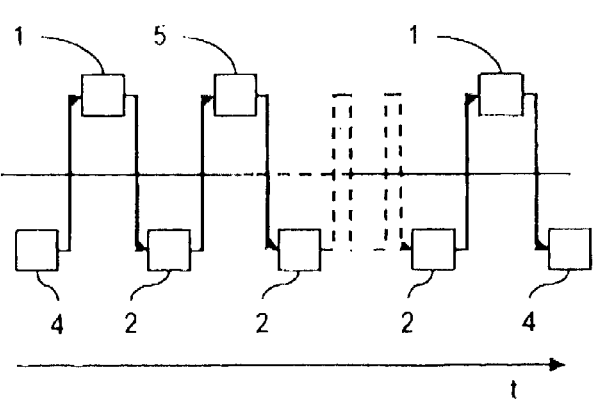
Figure 5:
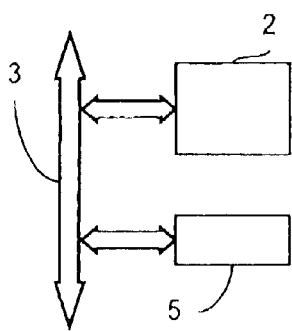
Figure 6:
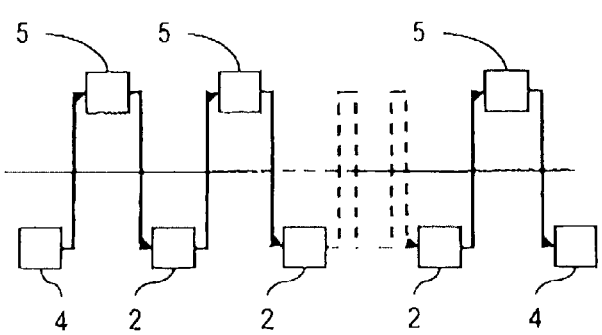
Figure 7:
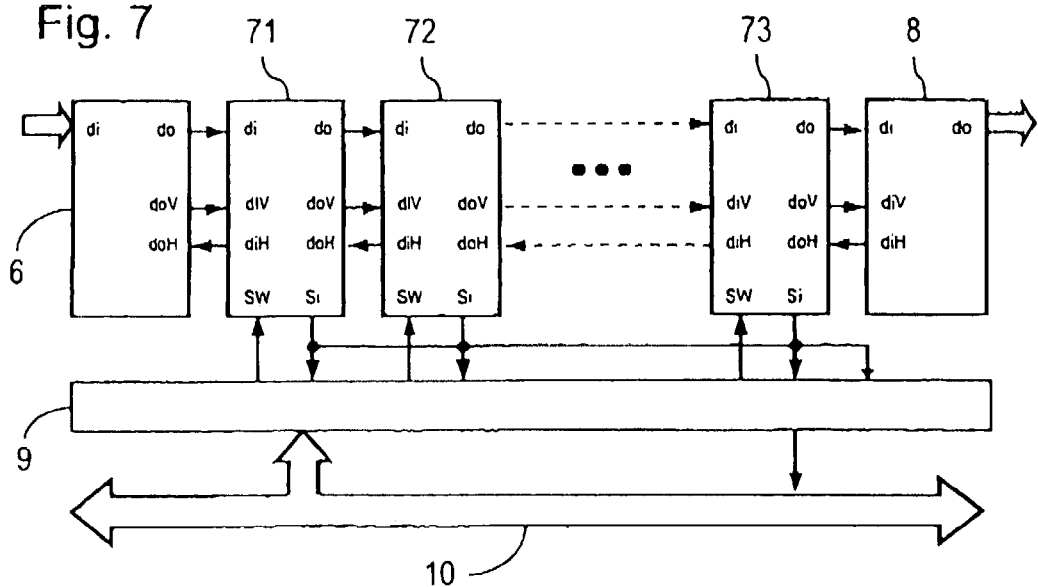
FIG. 7 shows a processing flow chain according to the invention, including a plurality of dedicated processing modules.

FIG. 7 shows a processing flow chain (reference 18 in FIG. 12) according to the invention. The processing flow chain includes elements 6, 71 to 7n (wherein n=3 in this exemplary implementation) and 8, a control interface 9 and a bus 10. The elements include an input interface 6, n dedicated processing modules 71 to 7n and an output interface 8. The elements are connected so as to form a channel for transfer and processing of data between the input interface 6 and the output interface 8. The elements are also connected so as to form a control signal transfer channel. The control signals are intended to control the transfer of data in the processing flow chain.

The interface 6 has a data input di, a data output do, a data validation output doV and a block input doH. Each dedicated processing module 71 to 7n has a data input di, a data validation input diV, a block input doH, a block output diH, a data output do and a data validation output doV. The interface 8 has a data input di, a data validation input diV, a block output diH and a data output do.

The signals applied at the input di of an element are data to be processed or transferred. The signals applied at the output do of an element are processed or transferred data. The processed or transferred data can be in series or in parallel. The size of the data bus between the elements of the chain is preferably constant along the chain.

The main control signals propagated in the processing flow chain are the following:
- the diV signals are intended to inform the element of the chain receiving it that the data transmitted by its predecessor is valid. These signals are therefore propagated in the direction of data transfer. The absence of a validation request at a diV input means that the data at the input di is not valid. This means, for example, that the preceding element is removing bits from the processed data flow. If a processing module receives valid data at its input di (if it receives a validation request at its input diV) and it applies valid data at its output do, it generates a validation request and applies it at its output doV. The signal doV issued by a given element of the chain is thus an AND logic between the presence of valid data items at the input di of this element and the presence of valid data items at the input di of each element preceding it in the chain.
- the doH signals are intended to inform the element of the chain receiving it that its successor cannot accept data. These signals are therefore propagated in the direction opposite that of the data transfer. The presence of a block request at a doH input means that a next element cannot accept data, for example, because this next element adds bits to the data processed or requires time for processing its input data. If a processing module receives a block request at its input doH or if this processing module determines the impossibility of processing new incoming data, it applies a block request at its block output diH. The signal diH at the level of a given element of the chain is thus an OR logic between the block requests generated either by this element or by the elements following it in the chain.

As the switching is reduced in the processing modules receiving a block signal, the current consumption is reduced.

In terms of storage management, the presence of invalid data at the input of the chain is not disruptive because invalid data is neither processed nor transmitted in the remainder of the chain. When an element of the chain generates a block request, the previous elements of the chain do not need a transfer with a buffer storage: as the block request is propagated in the direction of the input interface 6, each of these elements no longer applies new valid data at the input di of the element following it. The absence of such buffer storages makes it possible to reduce the static and dynamic consumption of the control flow chain: the number of components is indeed reduced and the transfers between these storages and the processing modules are suppressed.

A functional storage can of course be included in the processing flow chain, in particular after a processing module intended to perform an interleaving of data or before a processing module whose function requires knowing the entirety of a data block before proceeding with its processing (for example, for image compression by the wavelet method or compression in JPEG format on pixel blocks).

The interfaces 6 and 8 can be rate adaptation FIFOs, intended to decouple the input and the output of the processing flow chain. The interface 6 can in particular be connected to a device for receiving telecommunications signals having varying rates in a range between one kbit/s and a plurality of mbit/s. The interface 8 can in particular be connected to a multimedia processing device receiving a plurality of mbit/s. The interface 6 can be provided in order to perform a series/parallel conversion and, correspondingly, the interface 8 can be provided in order to perform a parallel/series conversion.

The bus 10 enables the processing flow chain to exchange control signals with external devices. The bus 10 in particular enables a software interface to intervene on the control signal transfer channel or on the data signal transfer channel. The software interface can then intervene separately at the control of each dedicated processing module, for example, to command a short-circuit of a processing module. Each dedicated processing module can be associated with control registers as well as status registers. Interruptions can thus be generated during specific events and make it possible in particular to resynchronize the data and control the processing flow. All of the interruptions are reported in the status registers.

The control interface 9 can be common to the various dedicated processing modules 71 to 7n, or each dedicated processing module can have its own control interface.

Figure 8:
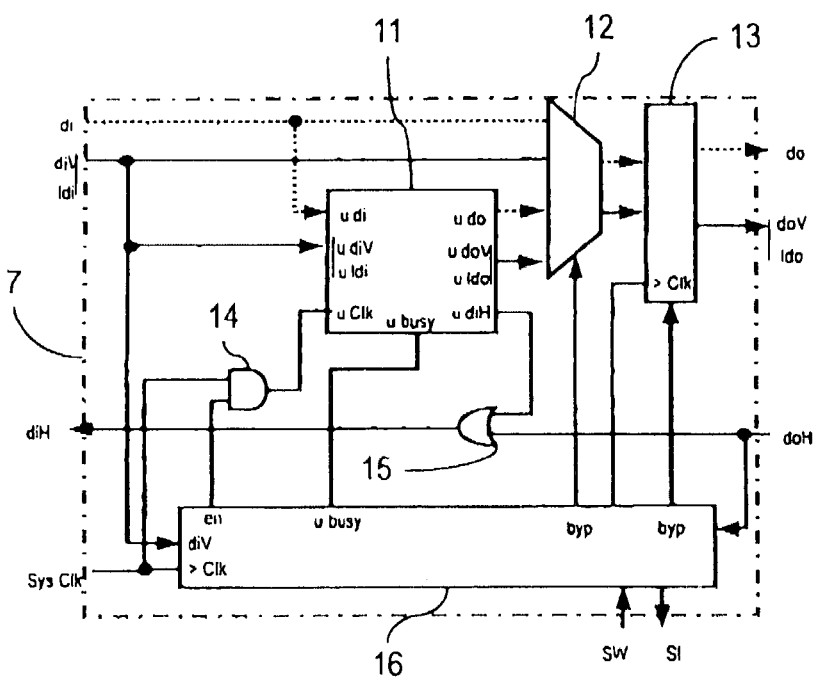
FIG. 8 shows an example of a dedicated processing module according to the invention.

FIG. 8 shows an embodiment of a processing module 7 according to the invention. In this dedicated processing module 7, the data paths are shown with dotted lines and the command and control signal paths are shown with solid lines. This processing module 7 comprises a processing component 11 provided to carry out the digital processing specific to data, and various components 12 to 16 forming a control device.

The processing component 11 has an input u di connected to the data input di, an input u div connected to the validation input diV, a clock input u clk, a data output udo, a validation request output u doV, a block request output u diH and an activity indication output u busy.

The processing module 7 includes a control component 16 managing the operation of the processing component 11. The control component 16 in particular manages the application of a local clock signal at the input u clk of the processing component 11. For this, the component 16 selectively applies an activation signal en at an input of an AND gate 14. A system clock signal sys clk is applied at another input of the gate 14. The output of the gate 14 is connected to the input u clk of the processing component 11. The control component 16 is thus capable of selectively blocking the application of a clock signal at the input u clk, and thus reducing the consumption of the processing component 11 when it is inactive.

To determine when the application of the clock signal at the input u clk must be blocked, the control component 16 receives and processes command and control signals. The control component 16 thus has a validation input diV, an input clk receiving a system clock sys clk common to the chain, a block input doH, an input u busy connected to the processing component 11 and an input SW for receiving commands coming from the interface 9.

The activation signal en invalidates the system clock signal applied at the AND gate 14 if:
- the component 16 receives a short-circuit command and the component 11 does not provide a signal at the input u busy;
- the component 16 does not receive a validation request at its input diV and the component 11 does not provide a signal at the input u busy;
- the component 16 receives a block request at its input doH while the component 11 applies a validation request at its output u doV.

The clock signal applied at the input u clk of the device 11 can thus be asynchronous with the rest of the chain.

The processing module 7 includes an OR gate 15 of which one input is connected to the block output u diH of the processing component 11 and of which the other input is connected to the block input doH of the module 18. The output of the OR gate 15 is connected to the block output diH of the module 18.

To give a software interface the possibility of short-circuiting the processing module 7 when it is unnecessary in the processing flow, this module 7 preferably comprises a multiplexing device 12. The multiplexing device 12 has an input connected to the data input di, an input connected to the validation input diV and two inputs connected respectively to the outputs u do and u doV of the component 11. The multiplexing device 12 also has a selection input receiving a selection signal applied by an output byp of the control component 16.

When a short-circuit command is received at its input SW, the control component 16 applies a short-circuit signal at the selection input of the device 12. The multiplexing device 12 then reproduces the state of the inputs di and diV at its outputs. The data input di of the module is then connected to the data output do, and the validation input diV of the module is then connected to the validation output doV. When no short-circuit signal is applied at the selection input, the device 12 reproduces the state of the outputs u do and u doV of the processing component 11 at its outputs.

Thus, each module can be short-circuited in the processing flow chain, for example for functional reasons or to perform a debugging test on the chain.

The block requests are subjected to a delay induced by the crossing of the OR gates 15. When the processing flow chain has a large number of dedicated processing modules, this delay can exceed the duration of a clock cycle and cause a synchronization problem. To avoid this type of problem, the processing module 7 advantageously has a resynchronization storage 13 storing the data to be applied at the data output do and the validation request to be applied at the output doV, during at least one clock cycle. The control component 16 then manages the resynchronization of the block request, with the resynchronization storage 13 then preventing a loss of information. To maintain a coherent control, the control device also performs a synchronization of the validation requests.

Figure 9:
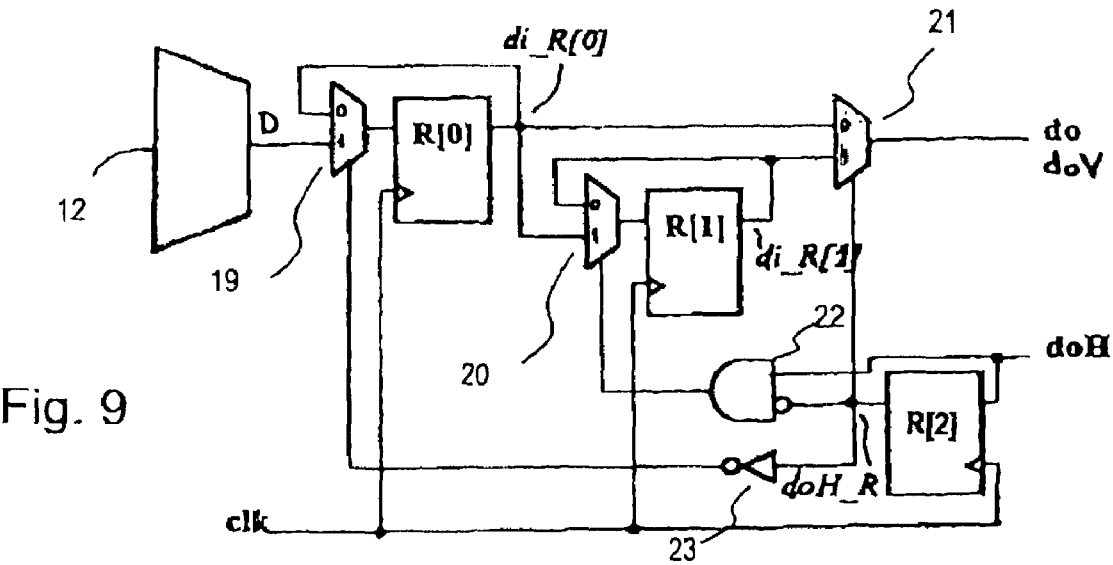
FIG. 9 shows an example of a resynchronization device.

FIG. 9 shows an example of the structure of the resynchronization memory 13. This memory 13 includes three registers R[0], R[1], and R[2], three multiplexing devices 19 to 21, an AND gate 22 and an inverter 23. The system clock signal is applied at the clock input of each of the registers.

The signal D (including data and a possible validation request) leaving the multiplexing device 12 are applied at an input of the multiplexing device 19. The other input of the multiplexing device 19 is connected to the output of the register R[0] (signal di_R[0]). The output of the device 19 is connected to the input of the register R[0]. The selection terminal of the device 19 is connected to the output of the inverter 23. The output of the register R[0] is connected to an input of the multiplexing device 20. The other input of the multiplexing device 20 is connected to the output of the register R[1] (signal di_R[1]). The selection terminal of the device 20 is connected to the output of the AND gate 22. The output of the register R[1] is connected to an input of the multiplexing device 21. The output of the register R[0] is connected to the other input of the multiplexing device 21. The output of the device 21 is connected to the data output and to the validation output doV. The selection terminal of the device 21 is connected to the output of the register R[2]. The signal doH is applied at the input of the register R[2] and at an input of the AND gate 22. The output of the register R[2] is connected to the input of the inverter 23, and connected to the other input of the AND gate 22 by means of an inverter.

Figure 10:
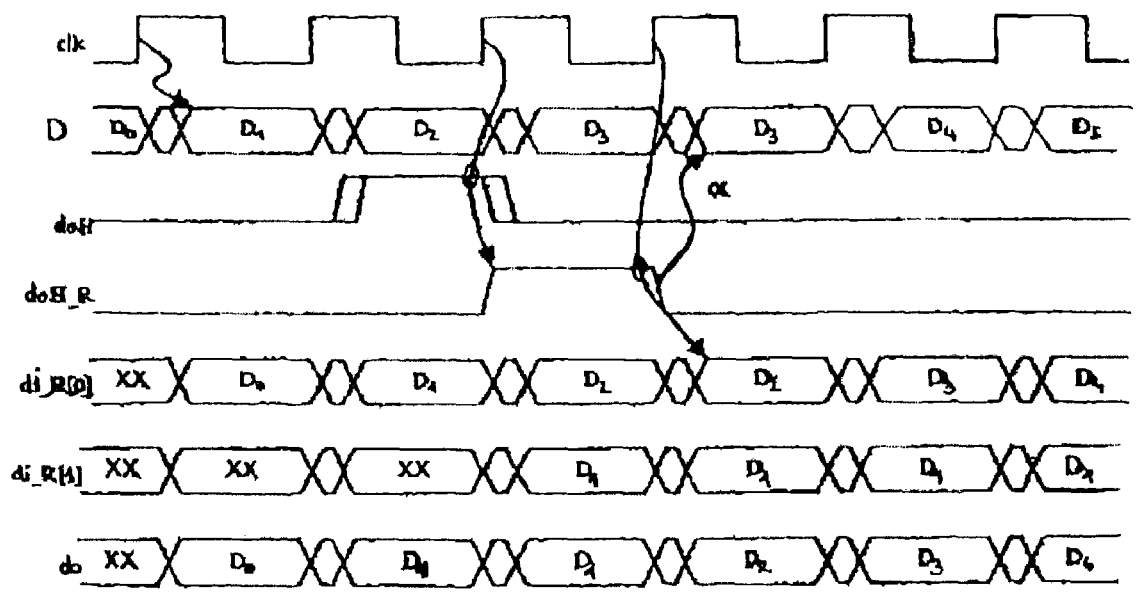
FIG. 10 shows a time chart of the operation of the resynchronization device.

FIG. 10 shows the operation of this storage when the module 7 receives a block request. The register R[0] and the device 19 make it possible to store the data applied by the preceding processing module when the rest of the processing flow chain is blocked. Thus, neither the processing component 7 nor the preceding processing module have to manage the synchronization. The register R[1], the device 20 and the gate 22 make it possible to store the data provided by the preceding processing module in the preceding cycle, when a transition at the input doH is detected. The register R[2] makes it possible to store the signal doH. The delay induced by R[2] is compensated by a register controlled by the state of R[2]. The register compensating for this delay is either R[0] when the state doH=1 is established, or R[1] when a transition from doH=0 to doH=1 is detected. This generated signal doH_R is applied indirectly at the output diH. It is thus ensured that the data and the validation request are indeed stored in the resynchronization storage 13 when the block request is executed, and that the block request is indeed executed by the preceding element of the chain.

It is thus noted that the transmission of data D3 is clearly blocked during a system clock cycle in the preceding element without losing the data D2 in the module 7 following the processing of the block request received at the input doH.

Figure 11:
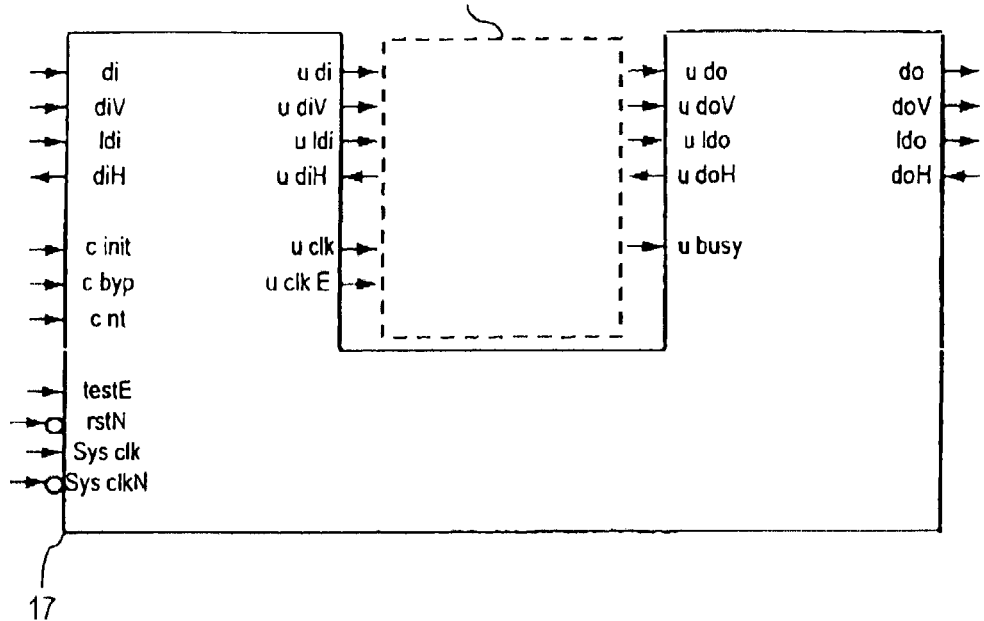
FIG. 11 shows the interfaces of the control device of the processing module of FIG. 8.

FIG. 11 shows an example of interfaces of a control device 17.

The table below shows the various signals exchanged at the interfaces of this control device:

| Name | Type | Size | Function |
|---|---|---|---|
| Synchronization signals | | | |
| Sys Clk | H | | System clock |
| Sys | H | | System clock complement |
| RstN | E | | Asynchronous reinitialization |
| TestE | E | | Switch to test mode |
| Command signals | | | |
| C | E | | Software initialization signal, erases |
| C byp | E | | Short-circuit of the processing component commanded |
| C nt | E | | Wakeup of the processing component commanded by |
| U | E | | The processing component indicates the |

-continued

| Name | Type | Size | Function |
|------|------|------|----------|
| U clk | S | | execution of a<br>Clock for the processing component |
| U clkE | S | | Clock validation of the processing component, enables synchronous operation of the processing components |
| Data signals | | | |
| Di | E | Di bits | Data provided at the input by the element |
| U di | S | Di Bits | Data to be processed, applied at the input of |
| Do | S | Do bits | Data applied at the output for the element |
| U do | E | Do bits | Processed data provided by the component of |
| Control signals | | | |
| DiV | E | | Validation of data to be processed, transmitted by |
| Ldi | E | | Indication by the preceding element of the end of |
| DiH | S | | Block request transmitted to the preceding element |
| U diV | S | | Validates the processing of data at the input of |
| U 1di | S | | Indicates the end of data of a block to be processed to |
| U diV | E | | Block request generated by the component of |
| DoV | S | | Validation of data to be processed, transmitted to |
| Ldo | S | | Indicates, to the next element, the end of data |
| DoH | E | | Block request transmitted by the next element |
| U doV | E | | Validation of processed data, generated by |
| U 1dO | E | | Indication of the end of data of a processed data block, generated by the processing component |
| U doH | S | | Block request transmitted to the component of |

In the second column, H identifies the clock signals, E identifies the incoming signals and S identifies the outgoing signals.

The control device 17 activates the processing component 11 when an external signal c init or c nt is received. The control device 17 also activates the processing component 11 when:

no block request is transmitted by the next element in the chain (input doH); and the preceding element in the chain transmits a validation request (input diV), or the processing component 11 indicates (at the input u busy) that is must continue an internal processing operation on data.

Figure 12:
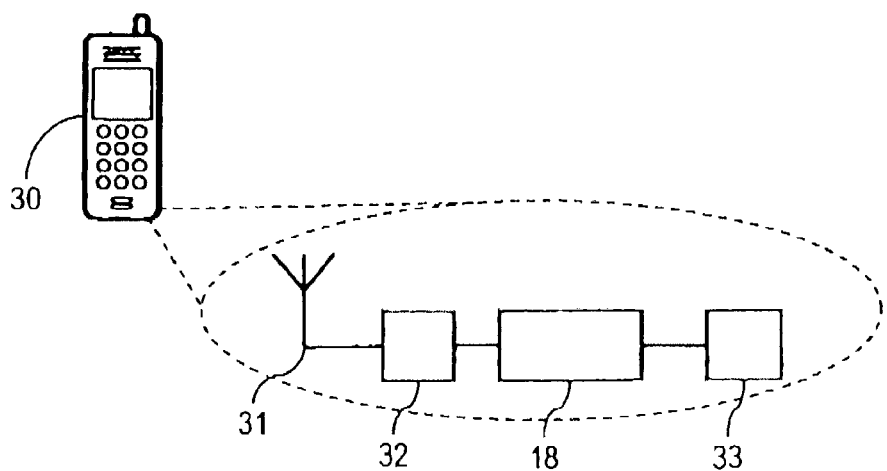
FIG. 12 shows a mobile telephone apparatus including a processing flow chain according to the invention.

FIG. 12 shows a mobile telephone apparatus 30 including a processing flow chain 18 according to the invention. The apparatus 30 includes a receiving antenna 31, a receiving device 32 processing the radiofrequency signals transmitted by the antenna, a processing flow chain 18 receiving, at its input interface, the data provided by the device 32, and a device 33 using the data provided by the output interface of the chain 18. The device 33 can include, in particular, multimedia processing means including a screen or loudspeakers of the apparatus 30.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A dedicated processing module, comprising:
an input for data to be processed and an output for processed data;
a block input and a block output;
a processing component is operable to perform a digital processing operation on the data present at the data input and apply the processed data at the data output;
a control device reproducing, at the block output, a block request applied to the block input or generated by the processing component and further operable to block the application of processed data at the data output upon receipt of a block request at the block input.

2. The dedicated processing module according to claim 1:
further including a validation input and a validation output;
wherein the processing component performs the digital processing operation on the data present at the data input only when a validation request is applied at the validation input, and
wherein the processing component further generates a request to validate processed data and applies this validation request at the validation output.

3. The dedicated processing module according to claim 2:
wherein the control device includes a multiplexing device having a first input connected to the input for data to be processed, a second input connected to the validation input, a third input receiving the data processed by the processing component, a fourth input receiving the data processed by the processing component, a fifth input receiving a validation request generated by the processing component;
wherein the control device selectively commands the multiplexing device to carry out: a connection of the data input to the output for processed data and a connection of the validation input to the validation output; or the application of data processed by the processing component to the processed data output and the application of a validation request generated by the processing component to the validation output.

4. The dedicated processing module according to claim 3:
wherein the processing component includes a clock input; and
wherein the control device includes a clock input, and operates to selectively reproduce the signal applied at its clock input at the clock input of the processing component.

5. The dedicated processing module according claim 4:
wherein the processing component provides the control device with a signal indicating that it is currently processing data;
wherein the control device does not reproduce the signal applied at its clock input at the clock input of the processing component in the absence of a signal indicating a processing operation in progress; and
wherein the control component commands the multiplexing device to carry out the connection of the data input to the processed data output and the connection of the validation input to the validation output.

6. The dedicated processing module according to claim 4, wherein the control device does not reproduce the signal applied at its clock input at the clock input of the processing component in the absence of a signal indicating a processing operation in progress and a validation request at the validation input.

7. The dedicated processing module according to claim 4, wherein the control device does not reproduce the signal applied at its clock input at the clock input of the processing component when a validation request is applied at the validation output and when a block request is applied at the block input.

8. The dedicated processing module according to claim 7, in which the control device includes a resynchronization device that:
upon receipt of a block request during a clock cycle, stores the data present at the data input and the validation request present at the validation input during this clock cycle, and reproduces the block request at the block output during the next clock cycle; and
during the clock cycle following the disappearance of the block request at the block input, applies the stored data and request respectively at the data output and at the validation output.

9. A processing flow chain, including:
a plurality of dedicated processing modules, each dedicated processing module comprising:
an input for data to be processed and an output for processed data;
a block input and a block output;
a validation input and a validation output;
a processing component is operable to perform a digital processing operation on the data present at the data input and apply the processed data at the data output only when a validation request is applied at the validation input, and wherein the processing component further generates a request to validate processed data and applies this validation request at the validation output; and
a control device reproducing, at the block output, a block request applied to the block input or generated by the processing component and further operable to block the application of processed data at the data output upon receipt of a block request at the block input;
wherein the plurality of dedicated processing modules are connected in series in the chain such that the data output, the validation output and the block input of one module in the chain are connected respectively to the data input, the validation input and the block output of another following module in the chain.

10. The processing flow chain according to claim 9, wherein the control device of each processing module comprises:
a multiplexing device having a first input connected to the input for data to be processed, a second input connected to the validation input, a third input receiving the data processed by the processing component, a fourth input receiving the data processed by the processing component, a fifth input receiving a validation request generated by the processing component;
wherein the control device selectively commands the multiplexing device to carry out: a connection of the data input to the output for processed data and a connection of the validation input to the validation output; or the application of data processed by the processing component to the processed data output and the application of a validation request generated by the processing component to the validation output.

11. The processing flow chain according to claim 10:
wherein the processing component of each processing module includes a clock input; and
wherein the control device of each processing module includes a clock input, and operates to selectively reproduce the signal applied at its clock input at the clock input of the processing component.

12. The processing flow chain according to claim 11:
wherein the processing component of each processing module includes a clock input; and
wherein the control device of each processing module includes a clock input, and operates to selectively reproduce the signal applied at its clock input at the clock input of the processing component.

13. The processing flow chain according to claim 12, further including:
a control interface capable of providing the control device with a request to short-circuit a processing module;
wherein the control device commands the multiplexing device to carry out the connection of the data input and the validation input respectively to the processed data output and the validation output upon receipt of a short-circuit request.

14. The processing flow chain according to claim 9, further including:
an input interface having a data output, a validation output and a block input connected respectively to the data input, the validation input and the block output of a first one of the modules in the chain; and
an output interface having a data input, a validation input and a block output connected respectively to the data output, the validation output and the block input of a last one of the modules in the chain.

15. A mobile telephone apparatus, including:
a processing flow chain comprising:
a plurality of dedicated processing modules, each dedicated processing module comprising:
an input for data to be processed and an output for processed data;
a block input and a block output;
a validation input and a validation output;
a processing component is operable to perform a digital processing operation on the data present at the data input and apply the processed data at the data output only when a validation request is applied at the validation input, and wherein the processing component further generates a request to validate processed data and applies this validation request at the validation output; and
a control device reproducing, at the block output, a block request applied to the block input or generated by the processing component and further operable to block the application of processed data at the data output upon receipt of a block request at the block input;
wherein the plurality of dedicated processing modules are connected in series in the chain such that the data output, the validation output and the block input of one module in the chain are connected respectively to the data input, the validation input and the block output of another following module in the chain;
an input interface having a data output, a validation output and a block input connected respectively to the data input, the validation input and the block output of a first one of the modules in the chain, and further including a data input; and
an output interface having a data input, a validation input and a block output connected respectively to the data output, the validation output and the block input of a last one of the modules in the chain; and a device for transforming radiofrequency signals into a binary data flow, applying the binary data flow at the data input of the input interface.

16. A processing flow chain, including:

a plurality of dedicated processing modules connected in series, each dedicated processing module comprising:

a data input for receiving from a preceding module in the series data to be processed and a data output for outputting processed data to a subsequent module in the series;

a block input for receiving a block command from the subsequent module in the series indicating that the subsequent module cannot receive the processed data from the data output of the module, and a block output for outputting the block command to the preceding module in the series indicating that the module cannot receive the processed data from the data output of the preceding module; and a validation input for receiving a validation signal from the preceding module in the series indicating that the data received at the data input is valid and a validation output for outputting the validation signal to the subsequent module in the series indicating that the data output from the data output is valid.

17. The processing flow chain of claim 16 wherein the series connected dedicated processing modules are connected in the chain such that the data output, the validation output and the block input of one module in the chain are connected respectively to the data input, the validation input and the block output of another following module in the chain.

18. The processing flow chain of claim 16 wherein the dedicating processing module comprises a processing component operable to selectively perform a digital processing operation on the data present at the data input and apply the resulting processed data to the data output along with a validation signal which is applied to the validation output.

19. The processing flow chain of claim 18 wherein the dedicating processing module further comprises means for bypassing processing component digital processing of the data present at the data input and instead pass that data unprocessed on to the data output and pass the validation signal received at the validation input on to the validation output.

20. The processing flow chain of claim 18 further comprising a control device reproducing, at the block output, a block request applied to the block input or generated by the processing component and further operable to block the application of processed data at the data output upon receipt of a block request at the block input.

* * * * *